(12) United States Patent
Madsen et al.

(10) Patent No.: US 11,665,997 B2
(45) Date of Patent: Jun. 6, 2023

(54) ELECTRIC POWERED DISC MOWER

(71) Applicant: Kverneland Group Kerteminde, Kerteminde (DK)

(72) Inventors: Jan Vestergaard Madsen, Fredericia (DK); Nils Asbjørn Nes, Veitastrond (NO)

(73) Assignee: KVERNELAND GROUP KERTEM INDE AS, Kertem Inde (DK)

( * ) Notice: Subject to any disclaimer, the term of this patent is extended or adjusted under 35 U.S.C. 154(b) by 601 days.

(21) Appl. No.: 16/632,949

(22) PCT Filed: Jul. 11, 2018

(86) PCT No.: PCT/IB2018/055093
§ 371 (c)(1),
(2) Date: Jan. 22, 2020

(87) PCT Pub. No.: WO2019/021093
PCT Pub. Date: Jan. 31, 2019

(65) Prior Publication Data
US 2020/0214196 A1 Jul. 9, 2020

(30) Foreign Application Priority Data
Jul. 26, 2017 (NO) .................................. 20171254

(51) Int. Cl.
*A01D 34/78* (2006.01)
*A01D 75/30* (2006.01)
(Continued)

(52) U.S. Cl.
CPC ........... *A01D 34/008* (2013.01); *A01D 34/66* (2013.01); *A01D 34/74* (2013.01); *A01D 34/78* (2013.01);
(Continued)

(58) Field of Classification Search
CPC ...... A01D 34/008; A01D 34/66; A01D 34/74; A01D 34/78; A01D 75/306; A01D 2101/00
(Continued)

(56) References Cited

U.S. PATENT DOCUMENTS

| 3,070,938 A | 1/1963 | Winget |
| 5,996,323 A | 12/1999 | Campbell et al. |

(Continued)

FOREIGN PATENT DOCUMENTS

| CN | 102448283 A | 5/2012 |
| DE | 202013006712 U1 | 8/2013 |

(Continued)

OTHER PUBLICATIONS

International Search Report issued in connection with PCT Application No. PCT/IB2018/055093 dated Sep. 12, 2018.
(Continued)

*Primary Examiner* — Mahmoud Gimie
(74) *Attorney, Agent, or Firm* — Dennemeyer & Associates LLC

(57) ABSTRACT

Electric powered mower unit (1) comprising a frame (13) provided with connecting points (132) arranged for attaching the mower unit (1) to a tool-carrier (3) provided with an electric power unit (31), several cutting modules (11), each cutting module (11) being suspended vertically displaceable and non-rotatable in a cutting module guide (122) provided in the frame (13), charac-5 tensed in that each cutting module (11) comprises a cutting disc (111) and an elec-tric motor (112) powered by the electrical power unit (31), said cutting disc (111) being attached to a motor driving shaft (1121), and a actuator (121) forming a link between the cutting module (11) and the frame (13).

10 Claims, 5 Drawing Sheets

(51) Int. Cl.
*A01D 34/00* (2006.01)
*A01D 34/66* (2006.01)
*A01D 34/74* (2006.01)
*A01D 101/00* (2006.01)

(52) U.S. Cl.
CPC ........ *A01D 75/306* (2013.01); *A01D 2101/00* (2013.01)

(58) Field of Classification Search
USPC .............................................................. 56/6
See application file for complete search history.

(56) References Cited

U.S. PATENT DOCUMENTS

| | | | |
|---|---|---|---|
| 6,131,378 A * | 10/2000 | Lees | A01D 75/303 56/13.6 |
| 8,136,333 B1 | 3/2012 | Levin et al. | |
| 2004/0148917 A1 | 8/2004 | Eastwood | |
| 2005/0044832 A1 * | 3/2005 | Schlesser | A01B 73/067 56/6 |
| 2013/0152535 A1 | 6/2013 | Roberge | |
| 2016/0100523 A1 * | 4/2016 | Anderson | A01D 34/66 56/6 |
| 2016/0212935 A1 | 7/2016 | Nafziger et al. | |
| 2019/0075724 A1 * | 3/2019 | Becke | H02J 7/0048 |

FOREIGN PATENT DOCUMENTS

| | | |
|---|---|---|
| EP | 2412220 A1 | 2/2012 |
| EP | 2957162 A1 | 12/2015 |
| JP | 54-066233 A | 5/1979 |
| JP | 06-124119 A | 5/2006 |
| JP | 2012-187026 A | 10/2012 |
| JP | 2014-103932 A | 6/2014 |
| JP | 2014-212714 A | 11/2014 |
| JP | 2015-002688 A | 1/2015 |
| JP | 2016-208950 A | 12/2016 |
| SU | 1674726 A1 | 9/1991 |
| WO | 2016057837 A | 4/2016 |

OTHER PUBLICATIONS

Communication Pursuant to Article 94(3) issued by the European Patent Office in connection with Application No. 18750500.3 dated May 3, 2021.
Communication Pursuant to Article 94(3) issued by the European Patent Office in connection with Application No. 18750500.3 dated Dec. 2, 2020.
Office action for Chinese patent application 2018800486478 dated Oct. 28, 2021.
Office action for Japanese patent application 2020-503753 dated Mar. 23, 2022.
Office action for Russian patent application 2020108106 dated Oct. 5, 2021.

\* cited by examiner

ELECTRIC POWERED DISC MOWER

BACKGROUND OF THE INVENTION

The invention concerns an electric powered mower unit comprising a frame provided with connecting points arranged for attaching the mower unit to a tool-carrier provided with an electrical power unit, and several cutting modules, each cutting module being suspended vertically displaceable and non-rotatable in a cutting module guide provided in the frame.

In agriculture, drum mowers and disc mowers powered from the regular power take-off (PTO) of a tractor have become a dominating implement for mowing grass for the feeding of animals. An array of drums, respectively discs are connected to a frame provided with a common depth control sys-tem, e.g. in the form of support wheels. In an alternative embodiment the depth control system may be realized by a mower carrying arm having a hydraulic control system, either included in a linkage system of a tool-carrier or included in the mower framework. The drums of a drum type mower being supported in an overlaying frame, while the discs of a disc type mower being supported in an underlaying bar.

The development of electric power units for tool-carriers, e.g. tractors, either separate units releasably attached to the tool-carrier or electric power units integrated in the tool-carrier, possibly even combined with accumulators, has made electrical powering of implements relevant.

Still most implements powered from the electric power unit of a tool-carrier, has maintained the overall concept set by the requirements defined by the nature of mechanical power transmissions, i.e. large units without the possibility of individual adjustment of parameters like working position, speed etc. for each working element, i.e. each drum or disc of a mower performing the cutting of 20 grass.

EP 2957162 A1 discloses a self-propelled mower with an adjustable mowing width, including a self-propellable mower main body; at least one of a battery, an electric generator, and an engine, pro-vided inside; wings that are protruding from the mower main body, the protruding wings being re-tractable and an extension length of the wings being variable; a plurality of mowing units provided 25 protruding from a front face of the mower main body and a front face of the wings, each driven by an electric motor or the engine, the electric motor being powered by the battery or the electric generator.

From WO2016057837 it is known a contour following mower. A rotational coupling is connected to a motor attached to a mower frame, a mower drum unit being axially displaceable by a rotational coupling including a fixed portion connected to the frame and a rotatable portion, and a telescopic shaft operably coupled to the rotatable portion of the rotational coupling.

JP 200116221 A discloses an electric energy generator provided with a base 1, a tubular wind 5 guide element with a varying diameter and supported to a frame, and a windmill displaced in the tubular wind guide element, a means for displacing the windmill substantially consisting of one or more pivotable arms which extend between, on one hand, the frame and, on the other hand, the windmill and driving means for moving the arms.

From US 20020073674 A1 is known a mowing and mulching system for lawnmowers having multi-blade knives coupled to a motor-driven driving shaft and rotating in a pot-like cover opening at the bottom side. The blades are attached to a central hub part forming several cutting-edge segments on the leading edge zones of the knife blades in the direction of rotation and repelling or bucket-like baffle elements on the trailing edge zones.

The invention has for its object to remedy or to reduce at least one of the drawbacks of the prior art, or at least provide a useful alternative to prior art.

The object is achieved through features, which are specified in the description below and in the claims that follow.

The invention provides an electric powered mower unit comprising several cutting modules, each cutting module comprising a cutting disc provided with cutting blades or the like extending from a 20 periphery of the disc. Each cutting module is provided with an electric powered motor. Each cutting module is suspended in a mower frame via a cutting height control system arranged to displace the cutting module in the vertical direction relative the mower frame. The cutting height control system may be hydraulically or electrically powered. The cutting height of each cutting module might be set in accordance with the level of the ground adjacent the cutting module based on input from ground sensing means or input from a satellite-based positioning system (GPS or the like) or a combination thereof.

The mower frame may be connectable to a tractor drawbar or a tractor three-point linkage and may include one or more support wheels. Alternatively, the mower is an autonomous unit provided with an accumulator package and arranged to be automatically connected to a charging docking station.

The ground sensing means might be a simple mechanical arrangement mounted to the mower unit or each cutting module to evaluate the cutting height by a touching means on the ground or might be of a non-touching means like a radar sensor. Furthermore, the control system may consider the speed of the tool-carrier and its driving direction by steering wheel sensors either in combination with the satellite-based positioning system or individually.

The cutting height settings could also be changed depending of the performance of each cutting unit which means that the height of at least one cutting unit might be changed to a higher level in case that at least one of the motors receives its power limit because of hitting an obstacle or by reaching an area with a very high density of crop to be cut. The only restriction in changing the cutting height might be to keep the overlap between the cutting modules along the mower unit or in case that several mower units are attached to the tool-carrier to keep the overlap between the mower units.

In order to provide horizontal cutting overlap between adjacent cutting modules, the rotation of the motors of all the cutting modules in one mower unit are synchronized, thus preventing collision between cutter blades of adjacent cutting discs. Alternatively, the cutting modules of a mower unit 10 may be arranged in two rows transverse to the working direction of the mower, thus allowing in-creased distance between the cutting modules, still maintaining the overlap transverse to the working direction.

The frame of a mower unit may be sectioned, thus allowing the working width of a mower unit being adjustable by folding or raising one or more of the outer frame sections and breaking the power 15 supply to the respective cutting modules. Each of the frame sections may carry one or more cutting modules.

The invention is defined by the independent patent claim. The dependent claims define advantageous embodiments of the invention.

In a first aspect the invention relates more particularly to an electric powered mower unit comprising a frame provided with connecting points arranged for attaching the mower unit to a tool-carrier provided with an electric power unit, several cutting modules, each cutting module being suspended vertically displaceable and non-rotatable in a cutting module guide provided in the frame, wherein each cutting module comprises a cutting disc and an electric motor powered by the electrical power unit, said cutting disc being attached to a motor driving shaft, and an actuator forming a link between the cutting module and the frame.

An advantage of the invention is that the control of the cutting height of the individual cutting modules is simplified by displacing the cutter and the drive unit as a unit.

The actuator may be a spring. An advantage of this is that when a lower face of the cutting discs slides on the ground, the ground pressure can be adjusted to a minimum by the fact that the springs take most of the weight of the cutting modules, allowing the cutting modules to "float" by the use of simple, cost-effective means.

Alternatively, the actuator may be a hydraulic cylinder or an electric operated actuator. An advantage of this embodiment is that the cutting height of the cutting modules follows the ground without applying load to the ground.

A mower control system may be arranged to set a cutting height of each cutting module in accordance with the level of a ground adjacent the respective cutting module relative the level of the frame by processing of input from a ground sensing means or a satellite-based positioning system antenna or a combination thereof. An advantage of this is that the mower control system may base the cutting height setting on various input sources.

The rotation speed, direction of rotation and angle of rotation of the motors of all cutting modules may be synchronized. An advantage of this is that the cutting modules may be in line, providing a short length of the mower frame seen in the direction of travel of the mower.

The rotation speed may be individually settable for each motor. Furthermore, the direction of rotation may be individually settable for each motor. An advantage of such features is improved adaption of the cutting characteristics of the mower to the actual field conditions.

The cutting modules may be arranged in two rows transversely to a working direction of the mower unit. An advantage of this embodiment is that the motor control is simplified, allowing motors to run individually without the risk of conflict between adjacent cutting discs.

The frame may be sectioned, one or more outer frame sections being foldable relative a base frame section, each of the outer frame sections carrying at least one cutting module. Thus, the working width of the mower unit might be easily adjusted, even while the mower unit is running. Furthermore, the sections might be pivotable relative to the working direction e.g. to mow around 20 electrical towers and poles or fence posts.

In a second aspect the invention relates more particularly to an electric powered tool-carrier comprising one or more electric powered mower units as disclosed above, wherein the tool-carrier is autonomous and is arranged for automatic docking at an electric charger. Thus, the tool-carrier may perform long-term mowing without continuous need of an operator.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 2:
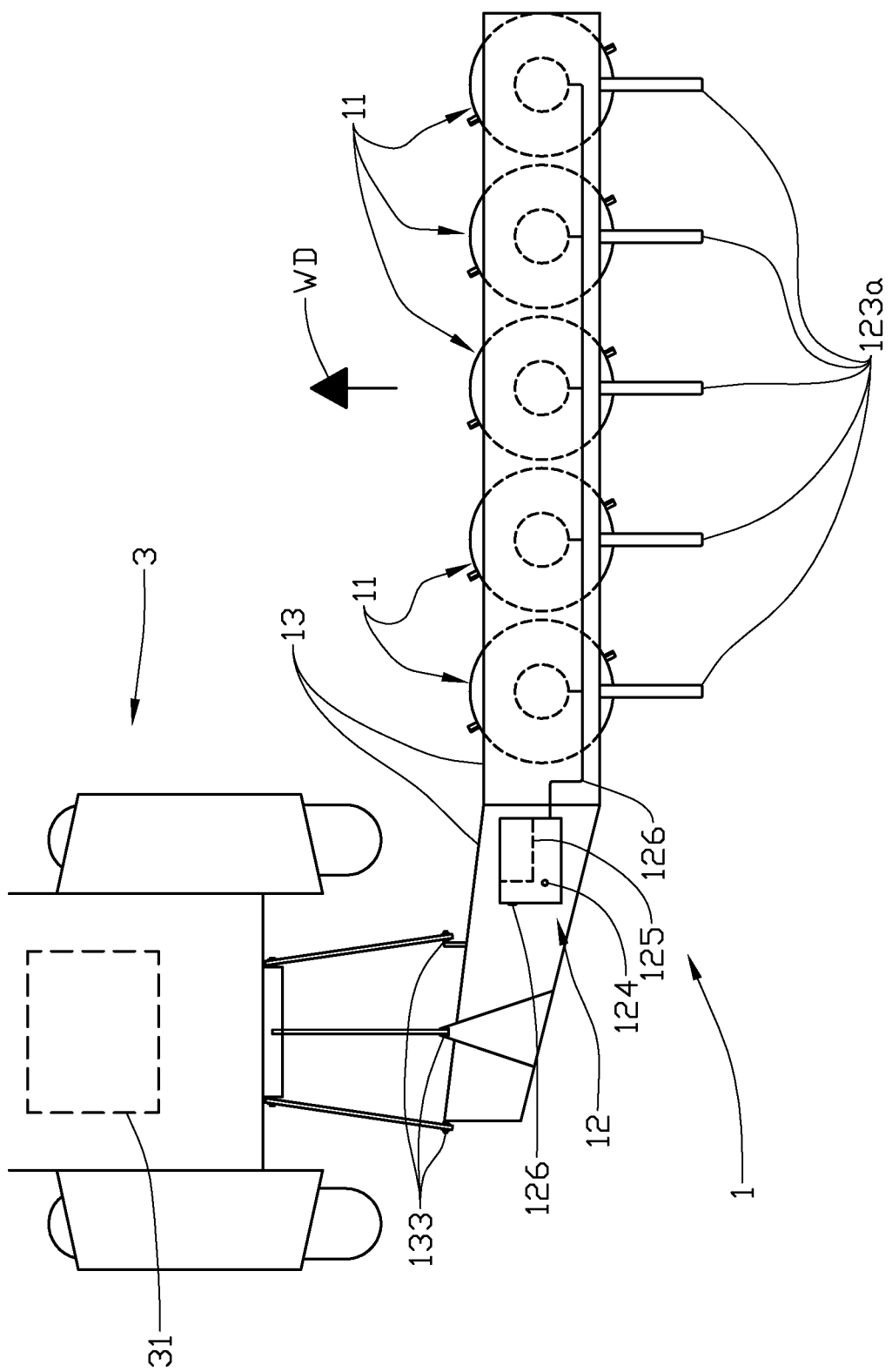
FIG. 2 depicts a top view of a first embodiment of the mower unit.

In the figures a mower unit 1 according to the invention is depicted, comprising several cutting modules 11 suspended in a frame 13. As shown in FIG. 2, the mower is arranged to be connected to a tool-carrier 3, e.g. a tractor, via connecting points 133, e.g. to a regular three-point linkage of a tractor. The tool-carrier 3 is provided with a power unit 31 arranged for supplying electric power to the mower 1 via a mower control system 12.

Figure 1:
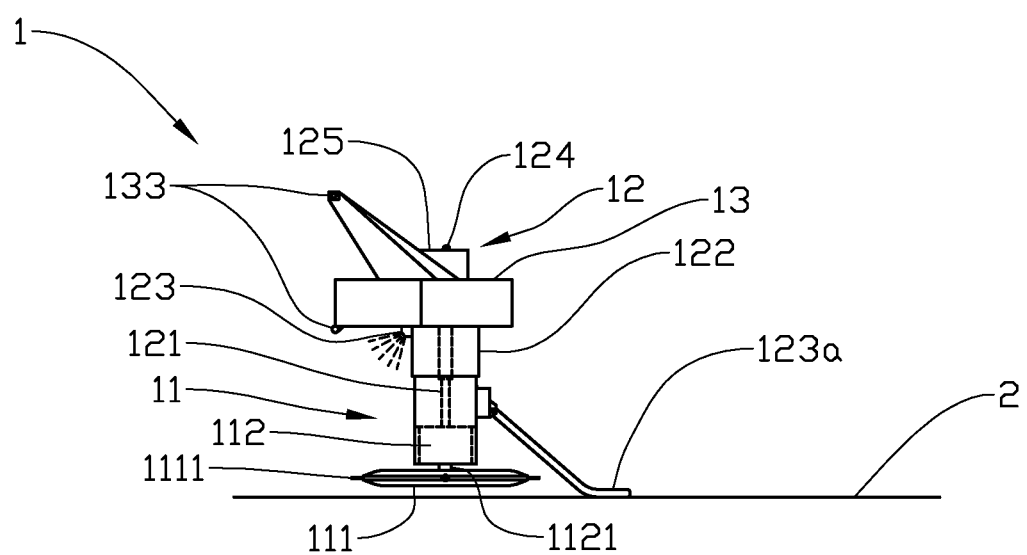
FIG. 1 depicts a side view of a mower unit according to the invention.

It is now referred to FIGS. 1 and 2. Each cutting module 11 comprises a cutting disc 111 arranged at an end of a drive shaft 1121 of an electric motor 112 and is rotated about an axis of rotation by the motor 112. The cutting discs are provided with cutting blades 1111 extending from the periphery of the cutting discs 111.

The cutting modules 11 are vertically displaceable relative the frame 13, the cutting modules 11 being accommodated in a non-rotational manner in cutting module guides 122 extending from the frame 13.

The mower unit 1 may be provided with one or more support wheels 14 located at the rear of the frame 13 (se FIGS. 3 and 4), possibly adjustable to allow the frame to be set at a desired height above a ground 3 on which the mower unit is travelling when cutting a crop.

A mower control system 12 being connectable to the power unit 31 of the tool-carrier 3 via one or more power supply contacts 126, said power unit 31 being arranged to supply electric power to the mower control system 12 and further on to the electric motors 112 and possibly also pressurised liquid to any kind of hydraulic cylinders, etc.

The mower control system 12 is provided with one or more control lines 125 connecting each of the cutting modules 11 and one or more actuator controls 125, transferring power to the electric motors 112 and possibly to actuators 121 arranged to displace the cutting modules individually relative to the frame 13.

In its simplest form the actuators 121 may be springs allowing the cutting units to "float", i.e. allowing each cutting module 11 to work with low pressure applied to the ground from a lower face of the cutting discs.

Alternatively, the actuators 121 may be electrically or hydraulically operated in the form of electric actuators or hydraulic cylinders.

When provided with electrically or hydraulically operated actuators 121, the mower control system 12 also includes ground sensing means in the form of one or more non-contacting ground sensing means 123 sensing the ground level in front of or behind the frame 13 or one or more ground sensing means 123a travelling on the ground behind the frame 13, every ground sensing means 123a preferably being adjustable by an actuator (not shown), possibly one for each cutting module 11, and/or a satellite-based positioning antenna 124 provided on the mower unit 1 as shown in the figures or alternatively on the tool-carrier 3, and control means (not shown) arranged to process data received from said ground sensing means 123, 123a or the satellite-based positioning antenna 124 or a combination thereof, thereby allowing the mower control system 12 to set the cutting height of each cutting module 12 individually at run, thus maintaining a set cutting height even when working on uneven ground.

When all cutting modules 11 are arranged in a line transverse to a working direction WD as shown in FIG. 2, the speed, the direction of rotation and angle of rotation of all motors 112 should be synchronised to allow overlap of the cutting range of cutting modules without any risk of collisions of cutting blades 1111 on adjacent cutting discs 111.

Figure 3:
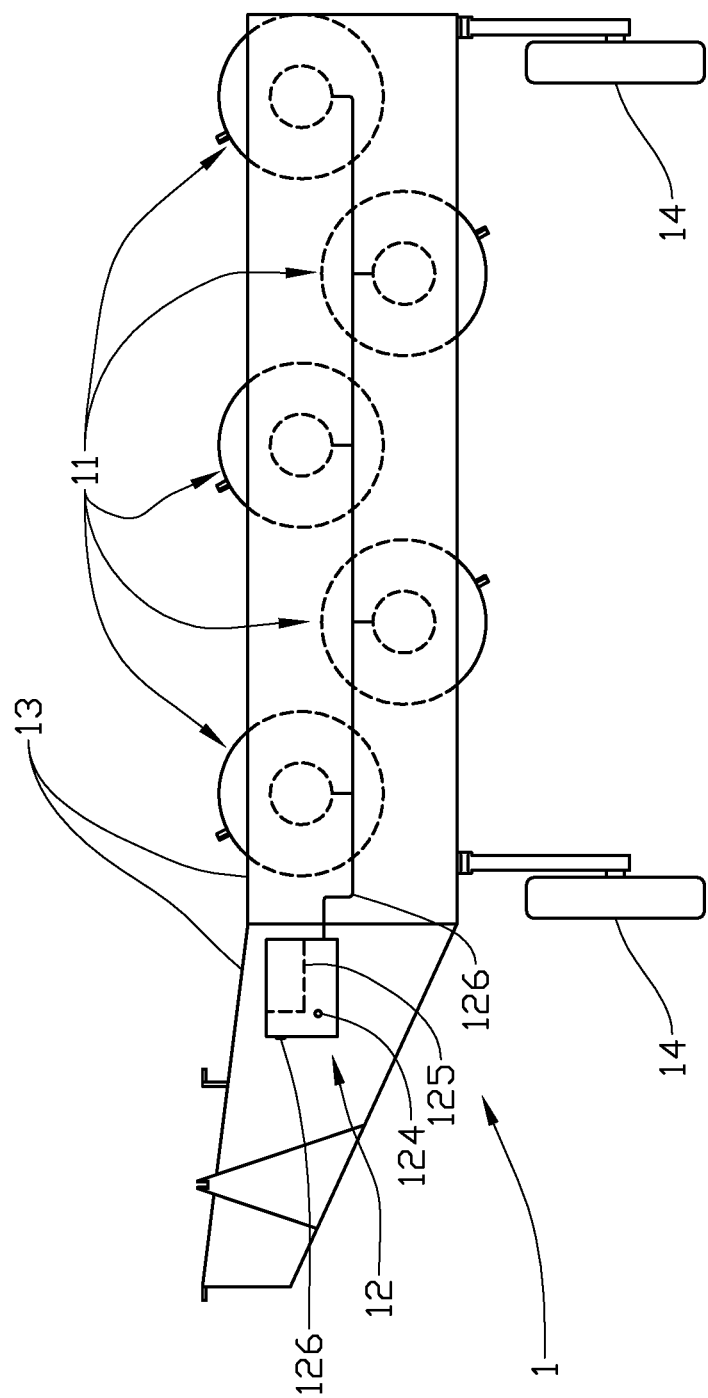
FIG. 3 depicts a top view of a second embodiment of the mower unit; 30

By arranging the cutting modules 11 in two rows, as shown in FIG. 3, the overlap is obtained without the need of synchronising the motors 112.

Figure 4:
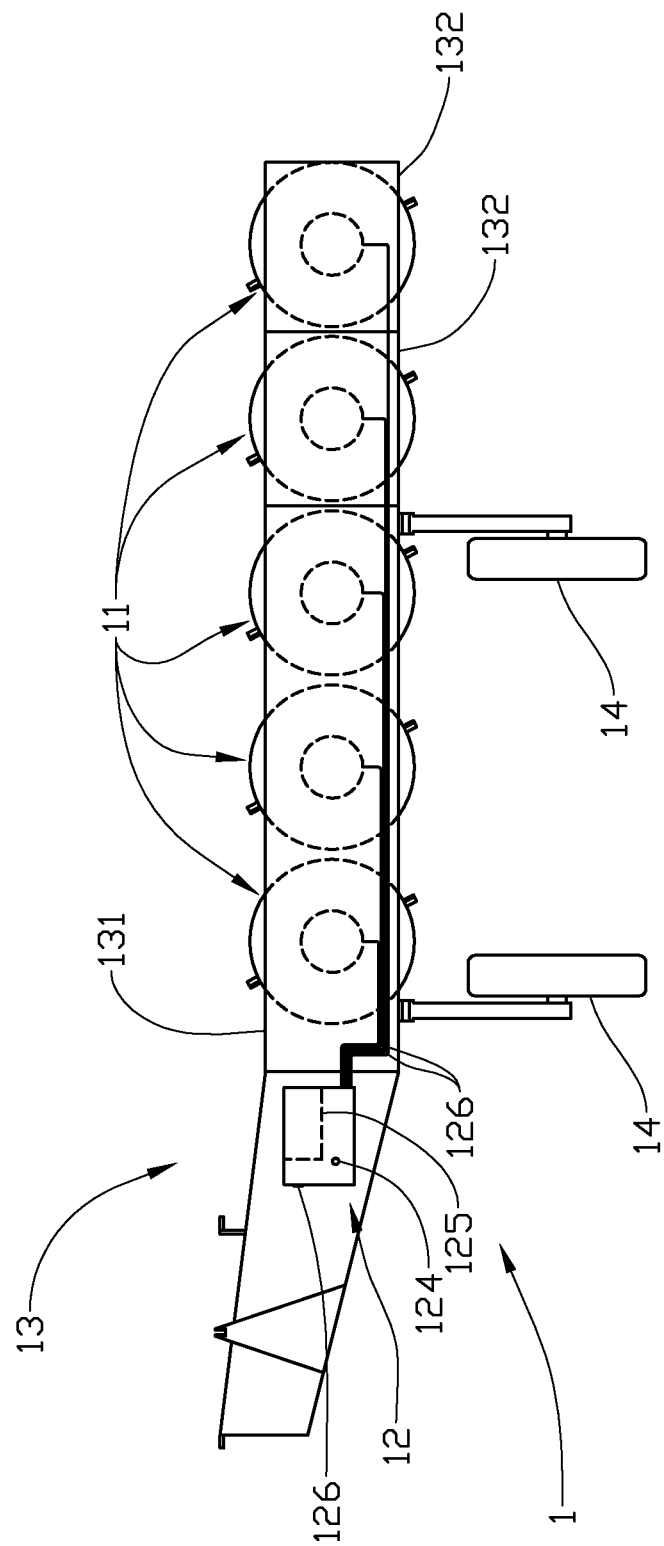
FIG. 4 depicts a top view of a third embodiment of the mower unit.
Figure 5:
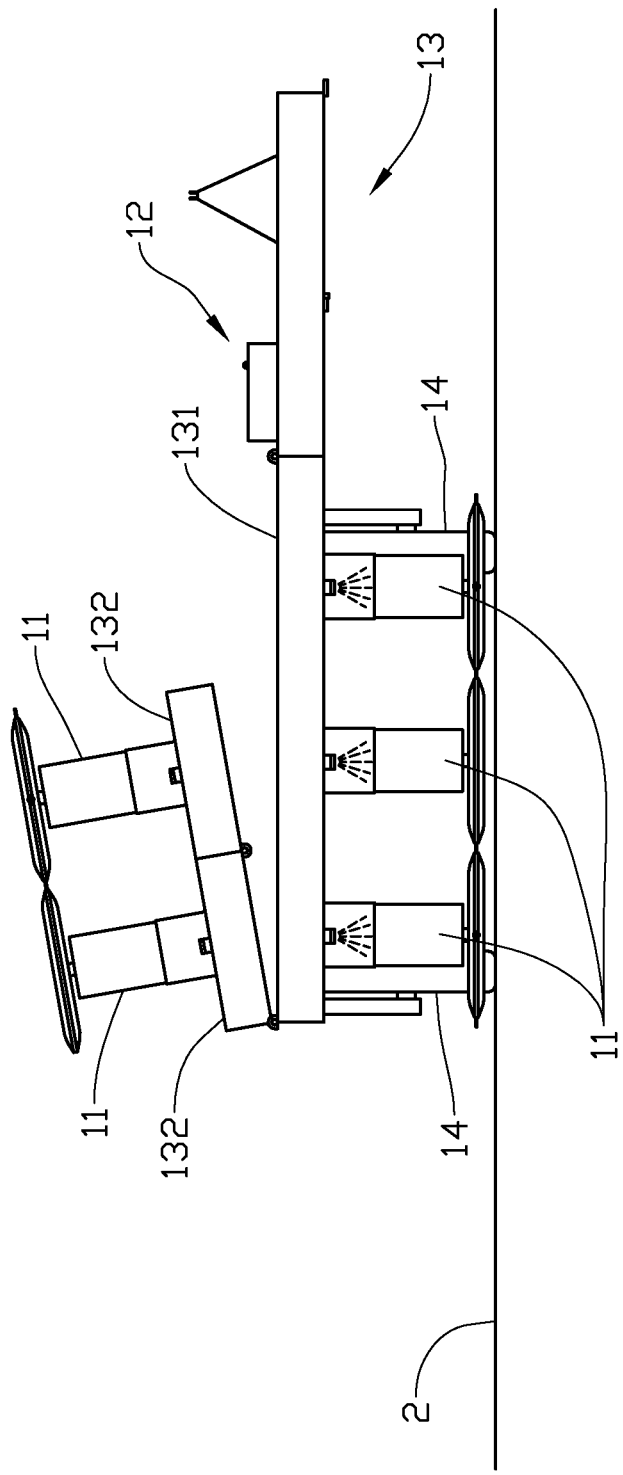
FIG. 5 depicts a front view of the third embodiment of the mower unit, wherein two frame section and the corresponding cutting modules have been folded in over the frame.

By providing a motor 112 in each cutting module 11, the mower unit 1 may easily be adapted to shape and size of the field to be mowed by arranging the mower with a foldable frame 13, see FIGS. 4 and 5. Foldable outer frame sections 132, here shown two foldable frames sections 132, are connected to a base frame section 131 by pivot joints 134. Each foldable frame section 132 may carry several cutting modules 11. The folding is preferably performed by one or more actuators, e.g. hydraulic cylinders (not shown).

When provided with foldable frame sections 132, the mower control system 12 is preferably arranged to start and stop at least the motors 112 of the cutting modules 11 suspended in the foldable frame sections 132 individually and independent of the remaining motors 112.

By including one or more mower units 1 according to the invention in an autonomous, electric tool-carrier provided with electric power accumulators and arranged for automatic docking at an electric charger, an unmanned, self-propelled mower is provided, performing automatic mowing at a reasonable capacity and flexibility.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:
1. Electric powered mower unit (1) comprising
  a frame (13) connectable to a tractor drawbar or a three-point linkage further comprising the frame (13) provided with connecting points (132) arranged for attaching the mower unit (1) to the tractor drawbar provided with an electrical power unit (31),
  several cutting modules (11), each cutting module (11) being suspended vertically displaceable and non-rotatable in a cutting module guide (122) provided in the frame (13), characterised in that
  each cutting module (11) comprises a cutting disc (111) and an electric motor (112) powered by the electrical power unit (31), said cutting disc (111) being attached to a motor driving shaft (1121), and
  an actuator (121) forming a link between the cutting module (11) and the frame (13)
  wherein a mower control system (12) is arranged to set a cutting height of each cutting module (11) in accordance with the level of a ground (2) adjacent the respective cutting module (11) relative the level of the frame (13) by processing of input from a ground sensing means (123, 123a) or a satellite-based positioning system antenna (124) or a combination thereof.
2. The electric powered mower unit (1) according to claim 1, wherein the actuator (121) is a spring.
3. The electric powered mower unit (1) according to claim 1, wherein the actuator (121) is a hydraulic cylinder or an electric operated actuator.
4. The electric powered mower unit (1) according to claim 1, wherein the ground sensing means is an adjustable skid (123a).
5. The electric powered mower unit (1) according to claim 1, wherein the rotation speed, direction of rotation and angle of rotation of the motors (112) of all cutting modules (11) is synchronized.
6. The electric powered mower unit (1) according to claim 1, wherein the rotation speed is individually settable for each motor (112).
7. The electric powered mower unit (1) according to claim 1, wherein the direction of rotation is individually settable for each motor (112).
8. The electric powered mower unit (1) according to claim 1, wherein the cutting modules (11) are arranged in two rows transversely to a working direction (WD) of the mower unit (1).
9. The electric powered mower unit (1) according to claim 1, wherein the frame (13) is sectioned, one or more outer frame sections (132) being foldable relative a base frame section (131), each of the outer frame sections (132) carrying at least one cutting module (11).
10. An electric powered tool-carrier (3) comprising one or more electrical powered mower units (1) according to claim 1, wherein the tool-carrier (3) is autonomous and is arranged for automatic docking at an electric charger.

* * * * *